(12) United States Patent
Corbet et al.

(10) Patent No.: US 10,874,977 B2
(45) Date of Patent: Dec. 29, 2020

(54) PROCESS FOR REMOVAL OF ACIDIC GAS CONSTITUENTS FROM SYNTHESIS GAS AND APPARATUS FOR PRODUCING RECYCLE GAS

(71) Applicant: L'Air Liquide, Societe Anonyme pour l'Etude et l'Exploitation des Procedes Georges Claude, Paris (FR)

(72) Inventors: Sharon Corbet, Frankfurt am Main (DE); Micro Guan, Shanghai (CN); Alfred Gubrinski, Erzhausen (DE); Dorit Rappold, Frankfurt (DE); Sophia Schmidt, Frankfurt am Main (DE)

(73) Assignee: L'Air Liquide Societe Anonyme Pour L'Etude Et L'Explotation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/561,677

(22) Filed: Sep. 5, 2019

(65) Prior Publication Data

US 2020/0078723 A1 Mar. 12, 2020

(30) Foreign Application Priority Data

Sep. 7, 2018 (EP) .................................. 18020437

(51) Int. Cl.
*C10L 3/10* (2006.01)
*B01D 53/14* (2006.01)
(Continued)

(52) U.S. Cl.
CPC ..... *B01D 53/1462* (2013.01); *B01D 53/1475* (2013.01); *B01D 53/18* (2013.01); *B01D 2257/504* (2013.01)

(58) Field of Classification Search
None
See application file for complete search history.

(56) References Cited

U.S. PATENT DOCUMENTS

| 4,568,364 A | 2/1986 | Galstaun et al. |
| 6,723,756 B2 * | 4/2004 | Munson ............. B01D 53/1475 518/700 |
| 2015/0165366 A1 | 6/2015 | Brandl et al. |

FOREIGN PATENT DOCUMENTS

| DE | 10 2009 015368 | 9/2010 |
| DE | 10 2015 005203 | 10/2016 |

(Continued)

OTHER PUBLICATIONS

Search Report for EP 18020437.2, dated Feb. 21, 2019 (machine translation).

*Primary Examiner* — Daniel Berns
(74) *Attorney, Agent, or Firm* — Justin K. Murray

(57) ABSTRACT

The invention relates to a process and a plant for removal of acidic gas constituents from synthesis gas by absorption in a physical scrubbing medium. A first scrubbing medium laden with at least carbon dioxide ($CO_2$) is supplied to a decompression vessel for depressurization from a first absorption apparatus via a first feed conduit. Furthermore, a second scrubbing medium laden with at least carbon dioxide ($CO_2$) is supplied to the decompression vessel for depressurization from a second absorption apparatus via a second feed conduit. The carbon dioxide concentration in the first laden scrubbing medium is higher than the carbon dioxide concentration in the second laden scrubbing medium. According to the invention it is provided that an at least partial commixing of the first and the second laden scrubbing medium is effected in the decompression vessel, wherein the commixing and depressurization affords a partially regenerated scrubbing medium and the first feed conduit and the second feed conduit are arranged such that carbon dioxide desorbed from the first laden scrubbing medium by the depressurization is at least partially absorbed by the second laden scrubbing medium.

13 Claims, 1 Drawing Sheet

(51) Int. Cl.
*B01D 53/18* (2006.01)
*B01D 53/62* (2006.01)
*B01D 53/78* (2006.01)
*B01D 53/96* (2006.01)

(56) References Cited

FOREIGN PATENT DOCUMENTS

EP         2 551 008        1/2013
WO    WO 2014/023419    2/2014

* cited by examiner

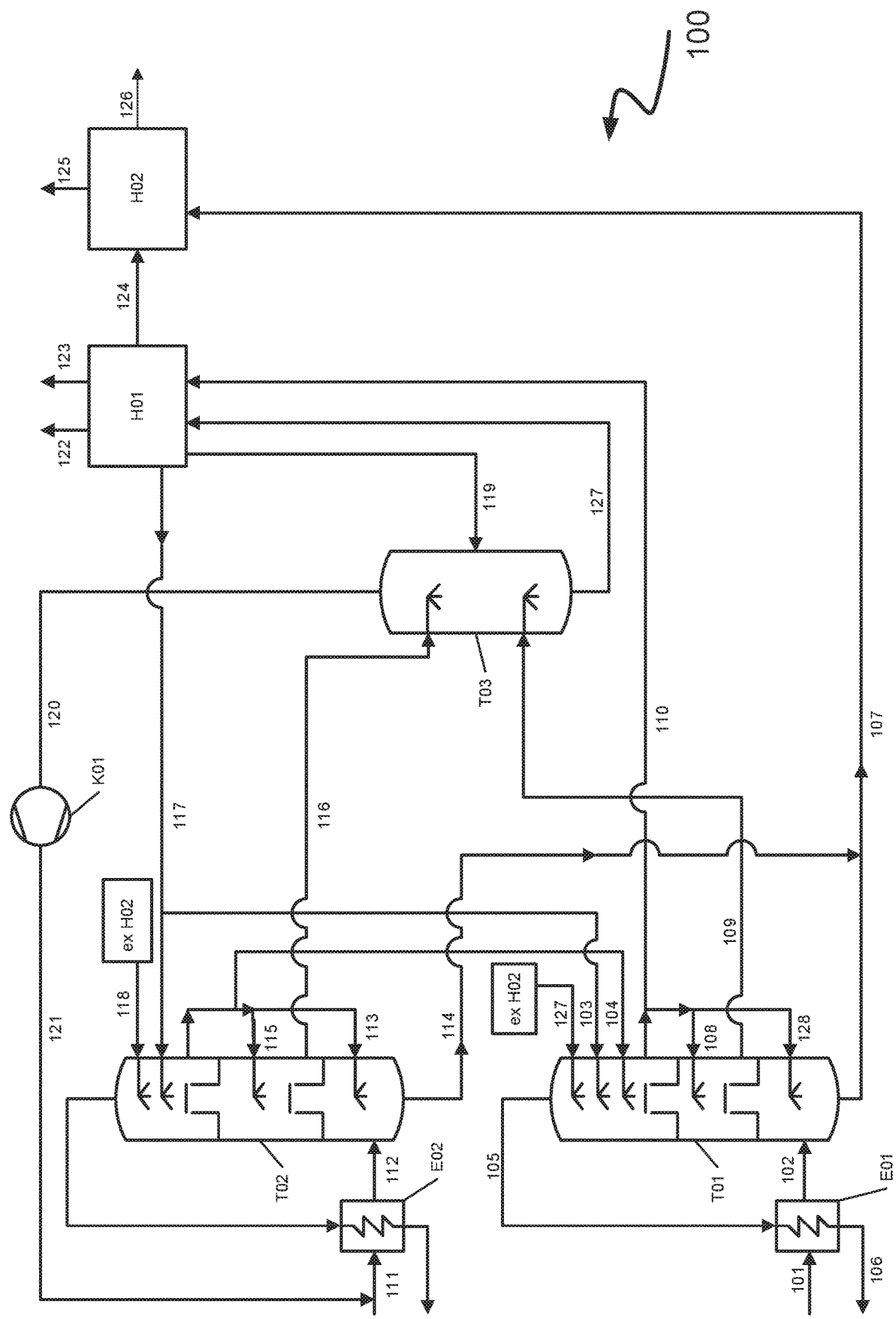

PROCESS FOR REMOVAL OF ACIDIC GAS CONSTITUENTS FROM SYNTHESIS GAS AND APPARATUS FOR PRODUCING RECYCLE GAS

CROSS REFERENCE TO RELATED APPLICATION

This application claims the benefit of priority under 35 U.S.C. § 119 (a) and (b) to European patent application No. EP18020437.2, filed Sep. 7, 2018, the entire contents of which are incorporated herein by reference.

FIELD OF THE INVENTION

The invention relates to a process for removal of acidic gas constituents from synthesis gas by absorption of the acidic gas constituents in a physical scrubbing medium. The invention further relates to an apparatus for producing a recycle gas from a scrubbing medium laden with at least carbon dioxide ($CO_2$) and to a plant for removal of acidic gas constituents from synthesis gas by absorption of acidic gas constituents in a physical scrubbing medium, wherein the plant includes an apparatus according to the invention.

PRIOR ART

Processes for removal of undesired concomitants from industrial crude synthesis gases by physical or chemical absorption are known from the prior art. Thus such processes may be used to remove, down to trace amounts, unwanted constituents of crude synthesis gases produced by gasification or reforming of carbon-containing inputs, for example carbon dioxide ($CO_2$) and hydrogen sulfide ($H_2S$) but also carbonyl sulfide (COS) and hydrogen cyanide (HCN), from the wanted synthesis gas constituents such as hydrogen ($H_2$) and carbon monoxide (CO).

These processes also referred to as gas scrubbings utilize the properties of liquids to absorb gaseous substances and to keep them in solution in chemically or physically bound form. The efficiency with which a gas is absorbed by a liquid is expressed by the absorption coefficient also known as the solubility coefficient. The better the absorption or dissolution of the gas in the liquid the greater the absorption coefficient. The absorption coefficient generally increases with decreasing temperature and, in accordance with Henry's law, with increasing pressure. The liquids employed in gas scrubbings are generally also referred to as scrubbing media.

Subsequently to the gas scrubbing the components scrubbed out of the crude synthesis gas in the gas scrubbing are removed from the laden scrubbing medium to obtain a regenerated or at least partially regenerated scrubbing medium. Known processes for regeneration of the scrubbing medium are depressurization with or without stripping gas and hot regeneration where the intrinsic vapour of the scrubbing medium is used as a stripping gas.

A known and often employed gas scrubbing process is the Rectisol process which is described in principle in Ullmann's Encyclopedia of Industrial Chemistry, 6th Ed. Vol. 15, p 399 et seq. In the Rectisol process the abovementioned undesired constituents of the crude synthesis gas are absorbed by cold methanol, i.e. methanol cooled significantly below ambient temperature, as an absorbent or scrubbing medium, wherein intensive mass transfer between the crude synthesis gas and the scrubbing medium takes place in an absorption apparatus also known as an absorber or scrubbing column. As mentioned above the solubility of the undesired gas constituents increases with decreasing temperature of the methanol and increasing pressure while remaining practically constant for hydrogen and carbon monoxide. Methanol additionally has the advantage of retaining a low viscosity even at temperatures down to −75° C., thus making it usable on a large industrial scale even at very low temperatures.

Gas scrubbing plants such as for example Rectisol plants are often used for purifying two or more crude synthesis gas streams by gas scrubbing. This has the advantage that a plurality of products for downstream processing may be produced. One example is the simultaneous production of purified shifted and unshifted synthesis gas for production of methanol, monoethylene glycol and hydrogen. In this process a crude synthesis gas from a gasification plant (coal gasification) and a shifted crude synthesis gas from a synthesis gas shift plant are purified with cold methanol at high pressures in dedicated absorption apparatuses. The proportions of shifted and unshifted synthesis gas may also be mixed in predefined ratios to establish an optimal stoichiometry for production of a particular product in a downstream synthesis, for example of methanol.

The term "shifted crude synthesis gas" is to be understood as meaning a crude synthesis gas that has been subjected to a water-gas shift reaction. This reaction reduces the carbon monoxide proportion in the crude synthesis gas while simultaneously increasing the hydrogen proportion by subjecting the carbon monoxide to catalytic reaction with water vapour to afford carbon dioxide and hydrogen. Carbon dioxide is generated as a byproduct. Shifted crude synthesis gases may also be referred to as converted crude synthesis gases.

The absorption apparatuses for the converted and unconverted crude synthesis gas each have dedicated regions for removal of acidic gas constituents and further impurities. As a result of selectivity of the respective scrubbing medium for particular gas constituents these are absorbed more or less easily. In the example of methanol, trace constituents such as hydrogen cyanide (HCN) are absorbed most easily followed by the sulfur compounds hydrogen sulfide ($H_2S$) and carbonyl sulfide (COS) and finally followed by carbon dioxide ($CO_2$) which, compared to the abovementioned gases, has the lowest absorption coefficient with regard to methanol. In the example of a gas scrubbing process with methanol as the scrubbing medium this selectivity has the result that the dedicated regions of the absorption apparatuses generally produce a scrubbing medium laden primarily with carbon dioxide, a scrubbing medium laden with hydrogen sulfide and carbon dioxide ("desulfurization"), and a scrubbing medium laden with trace constituents.

The valuable gases hydrogen ($H_2$) and carbon monoxide (CO) have an even lower absorption coefficient with regard to methanol than carbon dioxide. Nevertheless these valuable gases are co-absorbed in the scrubbing medium in relatively small amounts. In the example of methanol scrubbing the valuable gases are found primarily in the scrubbing medium containing hydrogen sulfide and carbon dioxide.

For recovery of valuable gases co-absorbed in the scrubbing medium it is typical for the laden solvent to be subjected to a decompression regeneration (flashing) at intermediate pressure and for the thus-desorbed valuable gases to be recycled to the absorption apparatus as recycle gas. This operation also desorbs carbon dioxide from the scrubbing medium and often represents the primary component in the recycle gas. Since carbon dioxide is generally not a valuable gas it constitutes an undesired component in the recycle gas.

In processes known from the prior art such as those of WO 2014/023419 A1 or DE 10 2015 005 203 A1 the laden scrubbing medium streams comprising valuable gases from the absorption apparatus used for the shifted crude synthesis gas and from the absorption apparatus used for the non-shifted crude synthesis gas are combined and subsequently sent for decompression regeneration to produce the recycle gas. The recycle gas is subsequently compressed in a compressor and recycled to one of the absorption apparatuses.

The higher the carbon dioxide content in the recycle gas in such a process the higher the costs for the plant operator. These include higher capital costs for a larger recycle gas compressor and/or larger absorption apparatuses. Elevated operating costs are also encountered due to the increased electrical power required for the compressor and elevated scrubbing medium requirements.

SUMMARY OF THE INVENTION

The present invention accordingly has for its object to at least partially overcome the abovementioned disadvantages of the prior art.

It is in particular an object of the present invention to specify a process by which the carbon dioxide proportion in the recycle gas may be reduced.

It is a further object of the present invention to specify a process in which the yield of valuable gases such as carbon monoxide and hydrogen in the recycle gas can be increased.

It is a further object of the present invention to specify an apparatus or a plant which at least partially achieves at least one of the objects recited above.

The objects of the invention are at least partially achieved by a process for removal of acidic gas constituents from synthesis gas by absorption of the acidic gas constituents in a physical scrubbing medium in which a first scrubbing medium laden with at least carbon dioxide ($CO_2$) is supplied to a decompression vessel for depressurization from a first absorption apparatus via a first feed conduit and a second scrubbing medium laden with at least carbon dioxide ($CO_2$) is supplied to the decompression vessel for depressurization from a second absorption apparatus via a second feed conduit, wherein the carbon dioxide concentration in the first laden scrubbing medium is higher than the carbon dioxide concentration in the second laden scrubbing medium. According to the invention it is provided that an at least partial commixing of the first and the second laden scrubbing medium is effected in the decompression vessel, wherein the commixing and depressurization affords a partially regenerated scrubbing medium and the first feed conduit and the second feed conduit are arranged such that carbon dioxide desorbed from the first laden scrubbing medium by the depressurization is at least partially absorbed by the second laden scrubbing medium.

In the context of the invention "synthesis gas" is to be understood as meaning a crude synthesis gas, i.e. a synthesis gas which (still) comprises undesired constituents of which it is to be freed by gas scrubbing in an absorption apparatus.

In one example the synthesis gas comprises at least the constituents hydrogen ($H_2$), carbon monoxide (CO), carbon dioxide ($CO_2$) and hydrogen sulfide ($H_2S$), wherein hydrogen ($H_2$) and carbon monoxide (CO) are valuable gases not to be removed and carbon dioxide ($CO_2$) and hydrogen sulfide ($H_2S$) are acidic gas constituents to be removed.

In one example the scrubbing medium is laden at least with carbon dioxide ($CO_2$) and hydrogen sulfide ($H_2S$).

The term "acidic gas constituents" is to be understood as meaning in particular gas constituents which are acidic in aqueous solution, in particular carbon dioxide ($CO_2$), hydrogen sulfide ($H_2S$), hydrogen cyanide (HCN), carbonyl sulfide (COS) and mercaptans (thiols).

A "physical scrubbing medium" is to be understood as meaning a scrubbing medium where the solubility of the particular gas in the scrubbing medium is brought about by physical interactions.

A "decompression vessel" is to be understood as meaning an apparatus in which a laden scrubbing material under a certain pressure, in particular under high pressure, or another liquid under high pressure is subjected to a depressurization. In other words the liquid, in particular the laden scrubbing medium, under high pressure undergoes a pressure reduction in the decompression vessel. In one example the laden scrubbing medium has a pressure of 20 to 100 bar. In a preferred example of a depressurization of the present invention the pressure is reduced to typically 15 to 40 bar in the decompression vessel which is considered by those skilled in the art to be a decompression to an intermediate pressure. Also conceivable, albeit less preferred in the context of the present invention, is a depressurization to a pressure of 20 to 70 bar (high pressure) or a depressurization to a pressure of 1.2 to 15 bar (low pressure).

The decompression vessel may alternatively also be referred to as a "depressurization vessel" or "flash vessel".

According to the invention a first laden scrubbing medium is supplied to the decompression vessel via a first feed conduit and a second laden scrubbing medium is supplied to the decompression vessel via a second feed conduit. The first laden scrubbing medium is produced in a first absorption apparatus and the second laden scrubbing medium is produced in a second absorption apparatus. In one example the first and/or the second laden scrubbing medium are withdrawn from the first and/or the second absorption apparatus and then sent directly to the decompression vessel. Also conceivable however are embodiments in which the feeding to the decompression vessel is not effected directly but rather further apparatuses, for example a stripping with an inert stripping gas, are provided.

The first feed conduit and the second feed conduit to the decompression vessel are spatially separate from one another so that an at least partial commixing of the first and second laden scrubbing medium can take place only in the decompression vessel. It is preferable when the first and second feed conduit are arranged such that no commixing of the first and second laden scrubbing medium takes place before the sending to the decompression vessel.

The carbon dioxide concentration in the first laden scrubbing medium is higher than the carbon dioxide concentration in the second laden scrubbing medium. This applies in relation to the concentrations in the laden scrubbing media before the first and the second laden scrubbing media are sent to the decompression vessel. In other words the carbon dioxide concentration in the first laden scrubbing medium is higher than in the second laden scrubbing medium before the first and second scrubbing media are subjected to a pressure reduction in the decompression vessel during which the concentration of carbon dioxide in the scrubbing medium is reduced by desorption.

The "carbon dioxide concentration" is to be understood as meaning the concentration of carbon dioxide in mol %, i.e. the molar proportion in relation to the total amount of substance of the liquid phase, wherein the liquid phase is composed of the amount of substance of the scrubbing medium and the amount of substance of the dissolved gases. In other words the specified concentration is based on the total amount of substance of the laden scrubbing medium. This applies analogously to concentrations specified for other absorbed gases.

In the decompression vessel gases absorbed in the first and second laden scrubbing medium are at least partially desorbed or liberated by the pressure reduction. Desorbed from the first laden scrubbing medium is a certain amount of carbon dioxide which on account of the arrangement of the first and second feed conduits may be at least partially reabsorbed by the second laden scrubbing medium entering the decompression vessel.

Since the second laden scrubbing medium in principle has a lower carbon dioxide concentration and is depleted of carbon dioxide by the pressure reduction in the decompression vessel itself, it is therefore able to absorb a certain amount of carbon dioxide from the first laden scrubbing medium.

The arrangement of the first and second feed conduits and the different carbon dioxide concentrations in the scrubbing medium substreams of the scrubbing media supplied to the decompression vessel results in the establishment in the decompression vessel of a carbon dioxide concentration gradient which allows a certain amount of carbon dioxide liberated from the first scrubbing medium to be (re)absorbed in the second scrubbing medium. This reduces the amount of gaseous carbon dioxide altogether generated in the decompression vessel since a portion of this carbon dioxide is absorbed in the second scrubbing medium and withdrawn from the decompression vessel therewith.

Consequently the amount of carbon dioxide to be discharged from the decompression vessel and thus the amount of recycle gas is altogether reduced compared to a process where the laden scrubbing media are mixed before being sent to a decompression vessel and the resulting scrubbing medium mixture is sent to a depressurization. The process according to the invention thus advantageously has the result that a smaller amount of recycle gas is to be compressed to the pressure prevailing in the absorption apparatus.

This reduces the load on the compressor which has the advantage that either a smaller compressor may be used and/or that a reduced amount of electrical power is required for an (existing) compressor. The load on the absorption apparatuses is also reduced on account of a smaller amount of recycle gas to be (re)absorbed. This has the advantage that either a smaller absorption apparatus is required and/or a smaller amount of scrubbing medium for use in the (existing) absorption apparatus is required.

An at least partial commixing of the first and the second laden scrubbing medium takes place in the decompression vessel. The extent of the commixing depends on the flow conditions prevailing in the decompression vessel. The commixing and depressurization in the decompression vessel has the result that a partially regenerated scrubbing medium is obtained from the scrubbing media streams (first and second scrubbing medium) originally entering into the decompression vessel. The term "partially regenerated" is to be understood as meaning that the gases absorbed in the scrubbing medium are not completely removed, i.e. desorbed, from the scrubbing medium under the conditions of the depressurization.

A preferred embodiment of the process according to the invention is characterized in that a first synthesis gas stream is supplied to the first absorption apparatus and a second synthesis gas stream is supplied to the second absorption apparatus, wherein the carbon dioxide content in the first synthesis gas stream is higher than the carbon dioxide content in the second synthesis gas stream.

Synthesis gas streams having different compositions are supplied to the first and second absorption apparatuses, wherein the carbon dioxide content in the first synthesis gas stream is higher than the carbon dioxide content in the second synthesis gas stream. In one example the elevated carbon dioxide content in the first synthesis gas stream is produced by a water-gas shift reaction in which carbon monoxide is subjected to catalytic reaction with water to afford carbon monoxide and hydrogen according to the following reaction equation:

$$CO + H_2O \rightleftharpoons CO_2 + H_2$$

The objective of the water-gas shift reaction is reduction of the carbon monoxide proportion in the synthesis gas to produce hydrogen.

In the present context the carbon dioxide content is to be understood as meaning the content of carbon dioxide in the synthesis gas in mol % based on the particular total composition of the gaseous mixture. The definition of "content" applies analogously to other constituents of the synthesis gas.

The higher carbon dioxide content in the first synthesis gas stream compared to the second synthesis gas stream results after absorption in the first or second absorption apparatus in a correspondingly higher carbon dioxide concentration in the first laden scrubbing medium compared to the second laden scrubbing medium.

A preferred embodiment of the process according to the invention is characterized in that the first synthesis gas stream has been subjected to a water-gas shift reaction and the second synthesis gas stream has not been subjected to a water-gas shift reaction.

In this variant of the process according to the invention the first synthesis gas stream contains a synthesis gas in which the carbon monoxide has been completely or substantially completely converted with water into carbon dioxide and hydrogen. Substantially completely is to be understood as meaning that at least 95 mol %, or 99 mol %, or 99.5 mol %, of the carbon monoxide present in the synthesis gas based on the originally present amount of substance has been converted.

In the present context the term "not been subjected to a water-gas shift reaction" is to be understood as meaning that the relevant synthesis gas has not been converted, i.e. is employed unchanged.

In a further example the process according to the invention is characterized in that the first synthesis gas stream has been partially subjected to a water-gas shift reaction and the second synthesis gas stream has not been subjected to a water-gas shift reaction.

When the first synthesis gas stream has been partially subjected to a water-gas shift reaction this is to be understood as meaning either that a defined mixture of completely converted and unconverted synthesis gas is present or that a certain amount of synthesis gas has been only partially converted with water. In one example of partially converted carbon monoxide at least 5 mol %, or at least 25 mol %, or 50 mol %, or 75 mol %, or 90 mol %, but less than 95 mol %, of carbon monoxide based on the originally present amount of substance has been converted.

In a further example the process according to the invention is characterized in that the first synthesis gas stream has been subjected to a water-gas shift reaction and the second synthesis gas stream has been partially subjected to a water-gas shift reaction.

In this variant of the process according to the invention the first synthesis gas stream contains a synthesis gas in which the carbon monoxide has been completely or substantially completely converted with water into carbon monoxide and hydrogen. Substantially completely is to be understood as meaning that at least 95 mol %, or 99 mol %, or 99.5 mol %, of the carbon monoxide present in the synthesis gas based on the originally present amount of substance has been converted. When the second synthesis gas stream has been partially subjected to a water-gas shift reaction this is to be understood as meaning either that a defined mixture of completely converted and unconverted synthesis gas is present or that a certain amount of synthesis gas has been only partially converted with water. In one example of partially converted carbon monoxide at least 5 mol %, or at least 25 mol %, or 50 mol %, or −75 mol %, or 90 mol %, but less than 95 mol %, of carbon monoxide based on the originally present amount of substance has been converted.

A preferred embodiment of the process according to the invention is characterized in that gases desorbed in the decompression vessel are recompressed and after compression are recycled to the first and/or the second synthesis gas stream as recycle gases.

The recycle gases may be recycled to an unconverted, completely converted or partially converted synthesis gas stream. The recycling is chosen such that a defined carbon monoxide content and/or hydrogen content in the synthesis gas may be established.

A preferred embodiment of the process according to the invention is characterized in that the carbon dioxide content in the recycle gas is not more than 65 mol %, preferably not more than 50 mol %, particularly preferably not more than 35 mol % and more preferably not more than 20 mol %.

Particularly in the case of partially converted synthesis gases carbon dioxide contents of less than 20 mol % are also achievable in the recycle gas. Typical ranges for the content of carbon dioxide in the recycle gas are 5 to 70 mol %, preferably 20 to 50 mol %.

In one example the carbon monoxide content in the recycle gas is at least 15 mol %, preferably at least 25 mol % and particularly preferably at least 30 mol %. In one example the hydrogen content in the recycle gas is at least 25 mol %, preferably at least 40 mol % and particularly preferably at least 50 mol %.

A preferred embodiment of the process according to the invention is characterized in that the first feed conduit is arranged below the second feed conduit.

In one example the first and second scrubbing media enter into the decompression vessel via a pressure reduction valve and a liquid distributor. The liquid droplets of the respective scrubbing medium move from top to bottom in the decompression vessel. In the bottom region of the decompression vessel the partially regenerated scrubbing medium is withdrawn. The gases desorbed from the first and second scrubbing media move from bottom to top and are withdrawn in the top region of the decompression vessel. When the first feed conduit which supplies the first scrubbing liquid having a higher carbon dioxide content is arranged below the second feed conduit the carbon dioxide desorbed from the first scrubbing medium and flowing upwards may be absorbed particularly simply and effectively by the second scrubbing medium moving downwards.

A preferred embodiment of the process according to the invention is characterized in that the carbon dioxide concentration in the first laden scrubbing medium is at least 5 mol % higher than in the second laden scrubbing medium, preferably at least 10 mol % higher, particularly preferably at least 15 mol % higher and more preferably at least 20 mol % higher.

The greater the difference in the carbon dioxide concentration between the first and second laden scrubbing medium the higher the carbon dioxide concentration gradient established in the decompression vessel. The greater this driving force the greater the absolute amounts of carbon dioxide that may be absorbed by the second scrubbing medium in the decompression vessel.

A preferred embodiment of the process according to the invention is characterized in that the partially regenerated scrubbing medium is withdrawn from the decompression vessel and sent to at least one further depressurization stage.

The partially regenerated scrubbing medium withdrawn from the decompression vessel is preferably sent to at least one further decompression stage which has a lower pressure than the pressure in the decompression vessel. In one example this may be a low-pressure decompression stage operated at a pressure of 1.2 to 15 bar. In one example the at least one further decompression stage or the further decompression stages produce(s) a carbon dioxide product stream of high purity and carbon dioxide-containing offgas.

A preferred embodiment of the process according to the invention is characterized in that a decompression gas withdrawn from the at least one further decompression stage is passed to the decompression vessel via a third feed conduit, wherein the third feed conduit is arranged such that carbon dioxide present in the decompression gas is at least partially absorbed by the second laden scrubbing medium.

Particularly the first of the at least one further decompression stage produces a decompression gas containing primarily carbon dioxide and previously co-absorbed valuable gases such as carbon monoxide and hydrogen. Through recycling of the decompression gas to the decompression vessel via the third feed conduit and the corresponding arrangement of the third feed conduit on the decompression vessel, the carbon dioxide present in the decompression gas from the at least one further decompression stage is absorbed by the second laden scrubbing medium. This further reduces the amount of carbon dioxide in the recycle gas exiting the decompression vessel. Furthermore, the previously co-absorbed valuable gases present in the decompression gas from the at least one further decompression stage are not absorbed by the second scrubbing medium. These consequently pass into the recycle gas exiting the decompression vessel as desired, are compressed in a recycle gas compressor and are recycled to one of the synthesis gas streams.

A preferred embodiment of the process according to the invention is characterized in that the third feed conduit is preferably arranged below the second feed conduit.

When the third feed conduit is arranged below the second feed conduit the carbon dioxide in the decompression gas withdrawn from the at least one further depressurization stage may be absorbed particularly simply and effectively by the second scrubbing medium. In this embodiment the feed conduit for the second scrubbing medium to the decompression vessel is arranged above the third feed conduit. The second laden scrubbing medium applied into the decompression vessel via a liquid distributor for example moves downwards and absorbs the carbon dioxide flowing from bottom to top.

In a preferred embodiment of the process according to the invention the third feed conduit is arranged below the first and second feed conduit.

The higher the carbon dioxide content in the gas supplied via the third feed conduit the greater the amount of methanol required for absorption of the carbon dioxide. According to the abovementioned arrangement the greater carbon dioxide proportion is absorbed by the methanol supplied with a higher preloading via the first feed conduit. Carbon dioxide not absorbed thus is subsequently absorbed by the methanol supplied via the second feed conduit. In this embodiment the carbon dioxide supplied via the third feed conduit is thus absorbed by the first and second laden scrubbing media. The abovementioned arrangement of the first, second and third feed conduits thus allows for complete or at least substantially complete absorption of the gas supplied via the third feed conduit while simultaneously requiring a smaller amount of methanol compared to other arrangements.

A preferred embodiment of the invention is characterized in that the physical scrubbing medium is selected from at least one element of the group comprising methanol, 1-methyl-2-pyrrolidone (NMP), an aqueous solution of 1-methyl-2-pyrrolidone (NMP), a mixture of dimethyl ethers of polyethylene glycol, and propylene carbonate (4-methyl-1,3-dioxolane-2-one).

It is more preferable when the physical scrubbing medium is selected from at least one element of the group consisting of methanol, 1-methyl-2-pyrrolidone (NMP), an aqueous solution of 1-methyl-2-pyrrolidone (NMP), a mixture of dimethyl ethers of polyethylene glycol and propylene carbonate (4-methyl-1,3-dioxolane-2-one).

It is particularly preferable to use methanol as the physical scrubbing medium.

The objects of the invention are moreover at least partially achieved by an apparatus for producing a recycle gas from a scrubbing medium laden with at least carbon dioxide ($CO_2$) comprising a decompression vessel for depressurization of a first and second scrubbing medium laden with at least carbon dioxide ($CO_2$); means for discharging recycle gases producible in the depressurization from the decompression vessel; means for discharging the partially regenerated scrubbing medium producible in the depressurization from the decompression vessel; a first feed conduit comprising a first pressure reduction element for supplying the first laden scrubbing medium to the decompression vessel; a second feed conduit comprising a second pressure reduction element for feeding the second laden scrubbing medium to the decompression vessel. According to the invention it is provided that the first feed conduit and the second feed conduit are arranged such that in the decompression vessel on account of a difference in the carbon dioxide concentration between the first and the second laden scrubbing medium carbon dioxide desorbable from the first laden scrubbing medium is absorbable by the second laden scrubbing medium.

The difference in the carbon dioxide concentration between the first and the second scrubbing medium results in a carbon dioxide concentration gradient in the decompression vessel so that through appropriate arrangement of the feed conduit for the first and the second laden scrubbing medium carbon dioxide desorbable from the first scrubbing medium is absorbable by the second scrubbing medium.

In one example the scrubbing medium is laden at least with carbon dioxide ($CO_2$) and hydrogen sulfide ($H_2S$).

It is preferable when the first feed conduit is arranged below the second feed conduit and/or the carbon dioxide concentration in the first laden scrubbing medium is higher than the carbon dioxide concentration in the second laden scrubbing medium.

A preferred embodiment of the apparatus according to the invention is characterized in that the apparatus has a third feed conduit for supplying a decompression gas from an at least one further decompression stage to the decompression vessel, wherein the third feed conduit is arranged such that the carbon dioxide present in the decompression gas from the at least one further decompression stage is at least partially absorbable by the second laden scrubbing medium.

The objects of the invention are moreover at least partially achieved by a plant for removal of acidic gas constituents from synthesis gas by absorption of the acidic gas constituents in a physical scrubbing medium containing a first absorption apparatus and a second absorption apparatus, each for removal of acidic gas constituents from synthesis gas, and an apparatus according to the invention for producing a recycle gas.

BRIEF DESCRIPTION OF THE DRAWINGS

The invention is more particularly elucidated herein below by way of an example without in any way limiting the subject matter of the invention. Further features, advantages and possible applications of the invention will be apparent from the following description of the working example in connection with the drawing and a numerical example.

The FIGURE shows a schematic diagram of an exemplary embodiment 100 of the process according to the invention/of the apparatus according to the invention as part of a plant according to the invention with methanol as the scrubbing medium.

DETAILED DESCRIPTION OF THE INVENTION

Converted synthesis gas (crude synthesis gas), i.e. synthesis gas reacted in a water-gas shift reaction, enters via conduit 101 into the indirect heat exchanger E01, is cooled therein and is sent via conduit 102 to the absorption apparatus T01. In absorption apparatus T01 the synthesis gas is scrubbed at high pressure (about 55 bar) by the methanol entering via the conduits 103, 104 and 127 and respectively connected liquid distributors. This affords a purified synthesis gas which exits absorption apparatus T01 via the conduits 105 and 106 while intermediately being warmed in the indirect heat exchanger E01. The absorption apparatus T01 has dedicated, i.e. separate, regions for removal of different impurities in the synthesis gas. The individual regions are separated from one another by chimney trays in T01. In a lower prescrubbing region of T01 hydrogen cyanide (HCN) and other trace impurities are removed from the synthesis gas by the methanol entering via conduit 128. Laden methanol resulting therefrom is withdrawn in the bottom region of the absorption apparatus T01 and via conduit 107 sent to an apparatus H02. H02 serves for hot regeneration of laden methanol and removal of water from hot-regenerated methanol. Primarily taking place in the middle region of the absorption apparatus T01 above the lower chimney tray is a desulfurization effected by the methanol supplied via conduit 108 and the liquid distributor connected thereto. The desulfurization removes hydrogen sulfide ($H_2S$) and carbonyl sulfide (COS) from the synthesis gas. The methanol supplied via conduit 108 contains carbon dioxide ($CO_2$) since it has already been used for removal of carbon dioxide in the upper region of the absorption apparatus above the upper chimney tray. Methanol resulting therefrom laden primarily with hydrogen sulfide and carbon dioxide is withdrawn from absorption apparatus T01 via conduit 109 and sent as the first laden scrubbing medium to the decompression vessel T03 via a depressurization valve (not shown). Conduit 109 is therefore a first feed conduit in the context of the invention. Decompression vessel T03 is operated at intermediate pressure (15 to 40 bar) and valuable gases absorbed in T01 (carbon monoxide, hydrogen) are desorbed by the pressure reduction in decompression vessel T03. In the upper region of the absorption apparatus T01, carbon dioxide is removed by scrubbing with methanol entering into the upper region of the absorption apparatus T01 via the conduits 103, 104 and 127 and respectively connected liquid distributors. The methanol laden with carbon dioxide subsequently passes via conduit 110 into the depressurization apparatus H01 which is operated at a lower pressure than T03 and in which carbon dioxide is removed from the laden methanol by depressurization (flashing). H01 comprises a plurality of depressurization stages, i.e. a plurality of decompression vessels connected in series, the pressure decreasing from vessel to vessel.

Operated simultaneously with the absorption apparatus T01 processing converted synthesis gas is absorption apparatus T02 in which unconverted (unshifted) synthesis gas is subjected to a gas scrubbing. Unconverted synthesis gas (crude synthesis gas) enters via conduit 111 into the indirect heat exchanger E02, is cooled therein and is sent via conduit 112 to absorption apparatus T02. The pressure in the absorption apparatus T02 is somewhat higher (57 bar) than the pressure in the absorption apparatus T01 (56 bar). Trace constituents such as hydrogen cyanide are removed in the lower part of the absorption apparatus T02 by methanol entering via conduit 113 and the liquid distributor connected thereto. Methanol laden with trace constituents is withdrawn via conduit 114 and sent via conduit 107 to the apparatus H02 for hot regeneration of the methanol. Synthesis gas in the absorption apparatus T02 then ascends further through the lower chimney tray upwards into the middle part of the absorption apparatus T02 in order therein to be subjected to a desulfurization. The desulfurization removes hydrogen sulfide and carbonyl sulfide from the synthesis gas. To this end the middle region of T02 is supplied via conduit 115 with methanol that has previously been laden with carbon dioxide in the upper region of T02. The methanol laden with sulfur components and carbon dioxide is subsequently sent via conduit 116 and a depressurization valve (not shown) to the upper region of the decompression vessel T03. Conduit 116 is therefore a second feed conduit in the context of the invention. Decompression vessel T03 is operated at intermediate pressure (15 to 40 bar) and valuable gases unintentionally absorbed in absorption apparatus T02 (carbon monoxide, hydrogen) are desorbed by the pressure reduction in decompression vessel T03. Laden methanol supplied via conduit 116 has a lower carbon dioxide concentration than laden methanol supplied via conduit 109.

Synthesis gas from the middle region of the absorption apparatus T02 ascends further through the upper chimney tray upwards into the upper region of the absorption apparatus T02. As described hereinabove it is essentially carbon dioxide that is removed therein. This is effected by the methanol supplied via conduit 117 which after depressurization in depressurization apparatus H01 is laden with only a little carbon dioxide. This is also effected by the methanol recovered by hot regeneration in apparatus H02 which is free from carbon dioxide residues. Hot-regenerated methanol is sent to the absorption apparatus T02 via conduit 118.

Methanol laden with hydrogen sulfide and carbon dioxide from absorption apparatus T02 is less heavily laden with carbon dioxide, i.e. has a lower carbon dioxide concentration, than methanol laden with hydrogen sulfide and carbon dioxide from absorption apparatus T01. This is because converted synthesis gas, which from the outset has a significantly higher carbon dioxide content than unconverted synthesis gas, is scrubbed in the absorption apparatus T01. The higher carbon dioxide content has a corresponding effect on the carbon dioxide concentration in the respective laden scrubbing medium (methanol).

Methanol laden with hydrogen sulfide and carbon dioxide from absorption apparatus T02 (unconverted synthesis gas) passes via conduit 116 into the upper part of decompression vessel T03. Methanol laden with hydrogen sulfide and carbon dioxide from absorption apparatus T01 passes via conduit 109 into the lower part of decompression vessel T03. The port for conduit 116 (the second feed conduit) is arranged above the port for conduit 109 (the first feed conduit) (ports not shown). An at least partial commixing of the laden scrubbing medium streams takes place in decompression vessel T03 and the depressurization to intermediate pressure desorbs valuable gases (carbon monoxide, hydrogen) and a portion of the absorbed carbon dioxide as decompression gases. Since the scrubbing medium stream from absorption apparatus T02 has a lower carbon dioxide concentration than the scrubbing medium stream from the absorption apparatus T01 the scrubbing medium stream from absorption apparatus T02 is supplied above the scrubbing medium stream from absorption apparatus T01 and carbon dioxide desorbed from the laden methanol supplied via conduit 109 can therefore be absorbed by the laden methanol supplied via conduit 116. Carbon dioxide desorbed in the lower part of the decompression vessel T03 is thus rescrubbed by methanol supplied in the upper region of the decompression vessel.

At the same time methanol laden with carbon dioxide is sent via conduit 110 to the decompression apparatus H01. The desorbed gases obtained in a first decompression stage of H01 and also containing co-absorbed valuable gases are sent via conduit 119 to the middle part of the decompression vessel T03. Carbon dioxide is additionally absorbed, i.e. rescrubbed, by the methanol supplied via conduit 116. The valuable gases altogether desorbed in T03, together with non-rescrubbed carbon dioxide, pass via conduit 120 into the recycle gas compressor K01 and therein are compressed to the pressure prevailing in absorption apparatus T02. After compression in K01 the recycle gases pass via conduit 121 to the synthesis gas stream in conduit 111, are cooled in the indirect heat exchanger E02 and sent via conduit 112 to the absorption apparatus T02.

In an alternative to the described example the recycle gases may also be recycled to the absorption apparatus T01 depending on the gas composition ultimately desired.

Further decompression stages of the depressurization apparatus H01 produce a high-purity carbon dioxide product stream and a carbon dioxide-containing offgas withdrawn via conduits 122 and 123.

The methanol laden with hydrogen sulfide and carbon dioxide withdrawn in the bottom region of T03 is sent via conduit 127 to depressurization apparatus H01. Methanol laden primarily with sulfur constituents obtained at low pressure in T03 is sent via conduit 124 to apparatus H02 for hot regeneration to effect desulfurization. In apparatus H02 a gas containing primarily hydrogen sulfide is produced and water is removed from methanol. Hydrogen sulfide is withdrawn from apparatus H02 via conduit 125 and water via conduit 126. The gas comprising primarily hydrogen sulfide, also known as acid gas, may after condensative removal of the methanol present therein be sent to a Claus plant for sulfur synthesis (not shown).

The advantages of the invention are more particularly elucidated in the comparative example which follows. The table which follows shows recycle gas compositions from a gas scrubbing process with methanol in which a substantially completely converted synthesis gas (shifted gas) and an unconverted (unshifted) synthesis gas have been subjected to a gas scrubbing in dedicated absorption apparatuses according to the above example. The example according to the invention compares the obtained recycle gas composition to a comparative example in which the scrubbing medium streams from the absorption apparatuses have been initially completely commixed and subsequently subjected to a customary depressurization (flashing).

|  | Example (invention) | Comparative example | Difference |
| --- | --- | --- | --- |
| $CO_2$ content in recycle gas | 31.0 mol % | 57.5 mol % | −26.5 mol % |
| CO content in recycle gas | 27.2 mol % | 15.8 mol % | +11.4 mol % |
| $H_2$ content in recycle gas | 40.7 mol % | 26.1 mol % | +14.6 mol % |
| $H_2$ + CO recovery for overall plant | 99.701% | 99.673% | +0.03% |
| Recycle gas compressor power consumption | 309 kW | 424 kW | −115 kW (−27%) |
| Cooling power consumption | 8400 kW | 8578 kW | −178 kW (−2%) |

The inventive example specifies a recycle gas having a content of 31.0 mol % of carbon dioxide which corresponds to an absolute improvement of 26.5 mol % compared to the value for the comparative example (57.5 mol %). In relative terms the process according to the invention reduces the carbon dioxide content in the recycle gas by about 46% and thus represents a significant improvement. This advantageously reduces the power consumption of the recycle gas compressor by 115 kW or in relative terms 27%. Simultaneously the power consumption of the cooling unit is advantageously reduced by 115 kW or in relative terms by 2% since the absorption apparatuses have a reduced amount of recycled gases to absorb and accordingly a reduced heat of absorption is generated. Simultaneously, the lower carbon dioxide content in the recycle gas means that the content of the valuable gases carbon monoxide and hydrogen advantageously increases by 11.4 mol % and by 14.6 mol % respectively.

The following table shows the individual concentrations of the components in the laden methanol obtained for the example and the comparative example. The left-hand column shows values for laden methanol from the gas scrubbing of the unconverted synthesis gas while the right-hand column shows values for laden methanol from the gas scrubbing of the substantially completely converted synthesis gas. The pressure during the gas scrubbing in the absorption apparatus was 56.7 bar in the case of the unconverted synthesis gas while the pressure was 55.3 bar in the case of the converted synthesis gas.

|  | Laden methanol from absorption apparatus for unconverted synthesis gas | Laden methanol from absorption apparatus for converted synthesis gas |
| --- | --- | --- |
| $CO_2$ concentration | 21.86 mol % | 40.22 mol % |
| CO concentration | 1.27 mol % | 0.05 mol % |
| $H_2$ concentration | 0.21 mol % | 0.53 mol % |
| $H_2S$ concentration | 0.49 mol % | 0.27 mol % |
| COS concentration | 0.00 mol % | 0.00 mol % |

The laden methanol having the composition of the left-hand column is an example of a second laden scrubbing medium in the context of the invention. The laden methanol having the composition of the right-hand column is an example of a first laden scrubbing medium in the context of the invention. The laden methanol according to the right-hand column was obtained from a second absorption apparatus in the context of the invention and has a markedly higher carbon dioxide concentration than the laden methanol according to the left-hand column which was obtained from a first absorption apparatus in the context of the invention.

Embodiments of the invention are described with reference to different types of subject matter. In particular, certain embodiments are described with reference to process claims while other embodiments are described with reference to apparatus claims. However, it will be apparent to a person skilled in the art from the description hereinabove and hereinbelow that unless otherwise stated in addition to any combination of features belonging to one claim type, any combination of features relating to different types of subject matter or claim types may also be contemplated. All features may be combined to achieve synergistic effects which go beyond simple summation of the technical features.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS

100 Process or plant according to the invention
101 to 127 Conduit

E01 Indirect heat exchanger
E02 Indirect heat exchanger
H01 Depressurization apparatus
H02 Apparatus for hot regeneration
K01 Recycle gas compressor
T01 Absorption apparatus
T02 Absorption apparatus
T03 Decompression vessel

The invention claimed is:

1. A process for removal of acidic gas constituents from synthesis gas by absorption of the acidic gas constituents in a physical scrubbing medium, the process comprising the steps of:
supplying a first scrubbing medium laden with at least carbon dioxide ($CO_2$) to a decompression vessel for depressurization from a first absorption apparatus via a first feed conduit;
supplying a second scrubbing medium laden with at least carbon dioxide ($CO_2$) to the decompression vessel for depressurization from a second absorption apparatus via a second feed conduit, wherein the carbon dioxide concentration in the first laden scrubbing medium is higher than the carbon dioxide concentration in the second laden scrubbing medium,
wherein:
an at least partial commixing of the first and the second laden scrubbing medium is effected in the decompression vessel, wherein the commixing and depressurization affords a partially regenerated scrubbing medium, and
the first feed conduit and the second feed conduit are arranged such that carbon dioxide desorbed from the first laden scrubbing medium by the depressurization is at least partially absorbed by the second laden scrubbing medium,
wherein a first synthesis gas stream is supplied to the first absorption apparatus and a second synthesis gas stream is supplied to the second absorption apparatus, wherein the carbon dioxide content in the first synthesis gas stream is higher than the carbon dioxide content in the second synthesis gas stream,
wherein the first synthesis gas stream has been subjected to a water-gas shift reaction and the second synthesis gas stream has been partially subjected to a water-gas shift reaction.

2. The process according to claim 1, wherein the first feed conduit is arranged below the second feed conduit.

3. The process according to claim 1, wherein the carbon dioxide concentration in the first laden scrubbing medium is at least 5 mol % higher than in the second laden scrubbing medium.

4. The process according to claim 1, wherein the physical scrubbing medium is selected from at least one element of the group comprising methanol, 1-methyl-2-pyrrolidone (NMP), an aqueous solution of 1-methyl-2-pyrrolidone (NMP), a mixture of dimethyl ethers of polyethylene glycol, and propylene carbonate (4-methyl-1,3-dioxolane-2-one).

5. The process according to claim 4, wherein the physical scrubbing medium is methanol.

6. A process for removal of acidic gas constituents from synthesis gas by absorption of the acidic gas constituents in a physical scrubbing medium, the process comprising the steps of:
supplying a first scrubbing medium laden with at least carbon dioxide ($CO_2$) to a decompression vessel for depressurization from a first absorption apparatus via a first feed conduit;
supplying a second scrubbing medium laden with at least carbon dioxide ($CO_2$) to the decompression vessel for depressurization from a second absorption apparatus via a second feed conduit, wherein the carbon dioxide concentration in the first laden scrubbing medium is higher than the carbon dioxide concentration in the second laden scrubbing medium,
wherein:
an at least partial commixing of the first and the second laden scrubbing medium is effected in the decompression vessel, wherein the commixing and depressurization affords a partially regenerated scrubbing medium, and
the first feed conduit and the second feed conduit are arranged such that carbon dioxide desorbed from the first laden scrubbing medium by the depressurization is at least partially absorbed by the second laden scrubbing medium,
wherein the partially regenerated scrubbing medium is withdrawn from the decompression vessel and sent to at least one further depressurization stage,
wherein a decompression gas withdrawn from the at least one further depressurization stage is passed to the decompression vessel via a third feed conduit, wherein the third feed conduit is arranged such that carbon dioxide present in the decompression gas is at least partially absorbed by the second laden scrubbing medium.

7. The process according to claim 6, wherein the third feed conduit is arranged below the second feed conduit.

8. The process according to claim 6, wherein the third feed conduit is arranged below the first and second feed conduit.

9. A process for removal of acidic gas constituents from synthesis gas by absorption of the acidic gas constituents in a physical scrubbing medium, the process comprising the steps of:
supplying a first scrubbing medium laden with at least carbon dioxide ($CO_2$) to a decompression vessel for depressurization from a first absorption apparatus via a first feed conduit;
supplying a second scrubbing medium laden with at least carbon dioxide ($CO_2$) to the decompression vessel for depressurization from a second absorption apparatus via a second feed conduit, wherein the carbon dioxide concentration in the first laden scrubbing medium is higher than the carbon dioxide concentration in the second laden scrubbing medium,
wherein;
an at least partial commixing of the first and the second laden scrubbing medium is effected in the decompression vessel, wherein the commixing and depressurization affords a partially regenerated scrubbing medium, and
the first feed conduit and the second feed conduit are arranged such that carbon dioxide desorbed from the first laden scrubbing medium by the depressurization is at least partially absorbed by the second laden scrubbing medium,
wherein a first synthesis gas stream is supplied to the first absorption apparatus and a second synthesis was stream is supplied to the second absorption apparatus,
wherein gases desorbed in the decompression vessel are recompressed and after compression are recycled to the first and/or the second synthesis gas stream as recycle gas.

10. The process according to claim 9, wherein the carbon dioxide content in the recycle gas is not more than 65 mol %.

11. The process according to claim 9, wherein the carbon dioxide content in the first synthesis gas stream is higher than the carbon dioxide content in the second synthesis gas stream.

12. The process according to claim 11, wherein the first synthesis gas stream has been subjected to a water-gas shift reaction and the second synthesis gas stream has not been subjected to a water-gas shift reaction.

13. The process according to claim 11, wherein the first synthesis gas stream has been partially subjected to a water-gas shift reaction and the second synthesis gas stream has not been subjected to a water-gas shift reaction.

* * * * *